Figure 1:
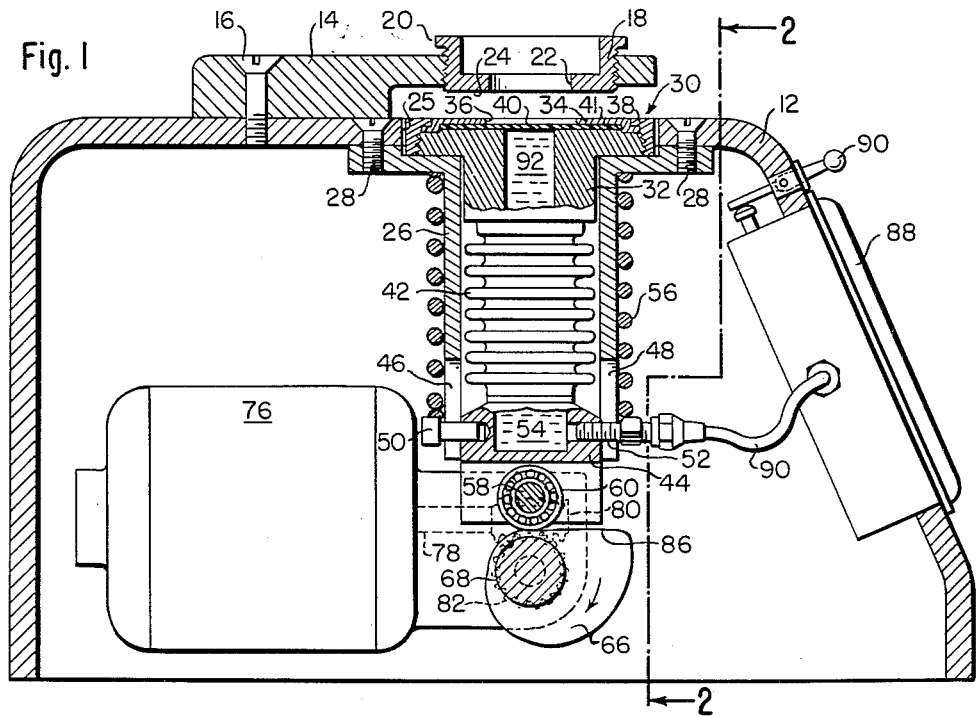

Dec. 20, 1955 P. H. MILLER 2,727,386

PAPER TESTING MACHINE

Filed Nov. 5, 1954

INVENTOR.
PHILIP H. MILLER
BY
ATTORNEYS

United States Patent Office 2,727,386
Patented Dec. 20, 1955

2,727,386

PAPER TESTING MACHINE

Philip H. Miller, Lake Worth, Fla., assignor to Crosby Steam Gage and Valve Company, Wrentham, Mass., a corporation of Massachusetts Application November 5, 1954, Serial No. 467,034

7 Claims. (Cl. 73—102)

The present invention relates to strength testing machines, and more particularly to machines for testing the bursting strength of sheet stock such as paper.

The strength of paper stock is customarily measured by the number of pounds per square inch of hydrostatic pressure required to burst a specimen supported between a pair of metal members having circular openings of specified size.

Conventional testing apparatus includes a clamping ring having a circular opening bounded by a grooved clamping surface, a diaphragm plate parallel to the ring having a circular opening coaxial with the ring opening and of slightly greater diameter, also bounded by a grooved clamping surface, and a rubber diaphragm supported adjacent the diaphragm plate on the side opposite the ring, and adapted to expand up through the holes in the ring and plate upon application of pressure. The procedure is first to insert a specimen between the clamping ring and diaphragm plate, then to secure it rigidly by pressing the ring and plate together, and finally to apply hydrostatic pressure to the diaphragm to expand it against the specimen with increasing force until the latter bursts. The apparatus includes a pressure gage adapted to measure the maximum pressure reached prior to bursting of the specimen.

Heretofore, the apparatus ordinarily employed for applying pressure to the rubber diaphragm has included a piston and drive means for the piston including reversing mechanism to return the diaphragm to its original position after the specimen has burst. In the absence of a perfect seal, which is rarely if ever obtainable, a certain amount of hydraulic fluid escapes from the cylinder around the piston over a period of time. While this condition may not result directly in producing an erroneous pressure reading for a particular specimen, it requires constant attention to insure that the total volume of fluid remains within certain permissible limits. Frequent replenishment or refilling increases the likelihood that small air bubbles may be inadvertently trapped in the cylinder, and lodged in a position against the operative portion of the diaphragm, where they may distort the latter and produce erratic results. It is also obvious that an imperfect seal around the piston may result directly in the introduction of air bubbles to the cylinder.

In addition, testing apparatus employing reversing mechanisms is relatively complicated and expensive, and must ordinarily include provision to prevent jamming of the piston at the limits of its stroke.

In some testing machines, difficulty has been experienced in preventing slippage of the specimens under test pressures. This is ordinarily the result of insufficient clamping force being exerted upon the ring and plate.

A principal object of the present invention is to provide a simple structure adapted to test specimens of sheet material in conformity with established testing standards, yet avoiding the problems of fluid leakage heretofore encountered.

An additional object is to provide a structure in which the necessity for elaborate reversing mechanism is obviated.

An additional object is to provide means for insuring adequate clamping pressure for specimens of widely varying bursting strength, while yet maintaining an over-all structure of relatively simple form.

A still further object is to provide means for clamping the specimen and thereafter increasing the pressure upon the diaphragm in a uniform, controlled manner, whereby highly consistent and reproducible results are achieved.

With these and other objects in view, a principal feature of the invention consists in the use of a fluid pressure system which includes a flexible bellows to produce variations in the displacement of the diaphragm.

An additional feature resides in an arrangement whereby the hydrostatic pressure is utilized to clamp the specimen in position and also to expand the diaphragm against it. The arrangement provides for a clamping pressure which increases in direct proportion to bursting strength of the specimen, thus greatly reducing the possibility of slippage.

A further feature resides in the use of a cam mechanism to control the rate of increase of fluid pressure. This must obviously be carefully controlled in order to insure uniformity and repetitive consistency of test results.

Other features of the invention reside in certain features of construction, modes of operation and arrangements of parts which will be more readily understood in connection with the following description of a preferred embodiment thereof.

Figure 2:
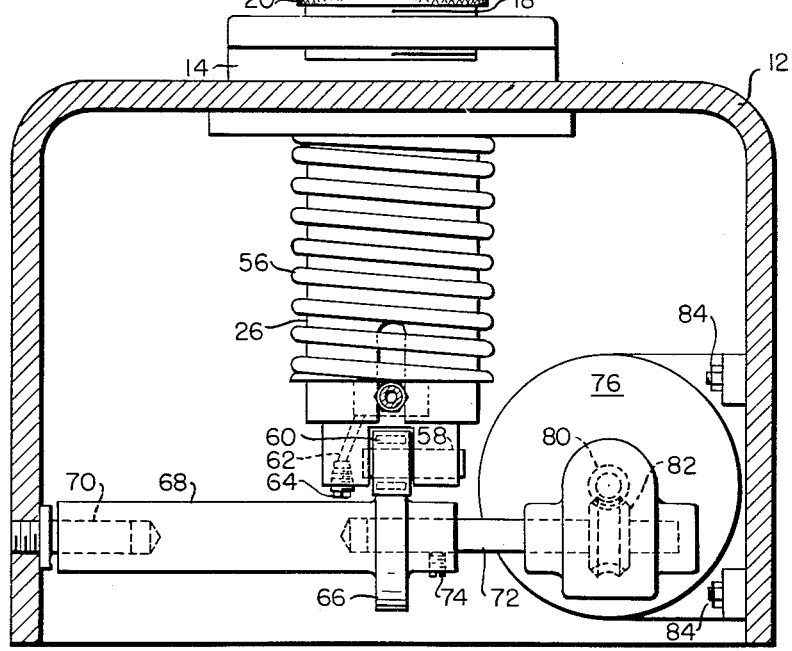

In the drawings, Fig. 1 is a side elevation in section of a paper testing machine embodying the invention; and Fig. 2 is an elevation in section taken on line 2—2 of Fig. 1.

Referring to the drawings, the assembly is supported within a casing or frame 12, preferably of rigid metal construction. The casing may be placed upon a table or other surface where it is substantially free from externally induced vibrations.

A rigid metal bracket 14 is secured to the upper surface of the casing by means of one or more screws 16. The bracket has a cut-away portion on the underside adjacent the casing, and the remaining portion in offset relation to the casing has a circular hole threaded to receive a clamping ring 18. A knurled flange 20 on the ring provides means for axial adjustment by rotating the ring within the bracket 14.

The clamping ring 18 has a circular opening 22 of the appropriate diameter as determined by the accepted testing standards. A bearing surface 24 on the ring is also machined according to the applicable standards. Thus, in the illustrated embodiment, the opening has a diameter of 1.200 inches, and the bearing surface has a continuous spiral 60 degree V-groove, countersunk 0.01 inch and of 1/32 inch pitch, the grooves starting at 1/8 inch from the edge of the opening. The circular edge of the opening adjacent the bearing surface is preferably relieved of sharpness by means of a very fine abrasive cloth (such as crocus cloth), but is not rounded off enough to alter effectively the diameter of the opening.

The casing 12 has a circular opening 25 in its upper surface coaxial with the opening 22 in the clamping ring. A rigid flanged metal sleeve 26 is secured to the underside of the opening 25 by means of a number of screws 28. As illustrated, this provides a shallow annular recess into which a flanged assembly 30 is slidably fitted.

The upper portion of the assembly 30 includes a bored-out flanged head member 32, a diaphragm plate 34 having a circular opening 36 concentric with the opening 22, a threaded locking ring 38 for the diaphragm plate, and a diaphragm 40 of rubber or other suitable elastic material clamped between the upper face of the head member 32 and the lower surface of the diaphragm plate 34.

The diameter of the opening 36 and the machining of the surface 41 of the plate 34 facing the surface 24 are determined by the accepted standards. In the illustrated embodiment, the opening 36 is 1.302 inches in diameter, and the bearing surface has a series of concentric 60 degree V-grooves, countersunk 0.01 inch and separated by 1/32 inch, the center of the first groove being 1/8 inch from the edge of the opening. The thickness of the plate 34 at the opening is 0.025 inch. The lower edge of the opening which is in contact with the diaphragm is rounded by means of an arc of 0.25 inch radius, and is relieved of sharpness sufficiently to prevent cutting of the diaphragm when pressure is applied.

The lower end of the head member 32 is sealed to an open end of a metallic bellows 42, by soldering for example. The opposite end of the bellows 42, which is also open, is similarly sealed to a base member 44 slidably received in the lower end of the sleeve 26. The sleeve has a pair of longitudinal slots 46 and 48, diametrically opposed. A metal pin 50 is driven or forced securely into a hole in the member 44 through the slot 46. A threaded tube 52 is received through the slot 48 into a second hole in the member 44. This tube thus communicates with a space 54 in the member 44, and therefore also with the interior of the bellows. A compression spring 56 bears at its upper end against the flange on the sleeve 26, and at its lower end against the pin 50 and tube 52.

A filling hole 62, closed by a threaded plug 64, communicates with the space 54 and provides means for filling the system with liquid.

The base member 44 is bored transversely as shown in Fig. 2 to receive a bearing shaft 58, and milled out to receive a roller bearing 60 carried on the shaft. The bearing 60 bears upon a cam 66 which is integral with a shaft 68 rotatably supported beneath the bellows assembly. The shaft 68 is pivoted about a fixed stud 70 secured in one wall of the shell, and is secured to a shaft 72 by means of a set screw 74.

The cam 66 is turned by means of a motor 76 having a shaft 78 which carries a worm 80. The worm is engaged with a suitable gear 82 which is fixed on the shaft 72. As shown in Fig. 2, the motor 76 is firmly secured to the inner wall of the shell 12 by means of bolts 84.

A suitable pressure gage 88 is connected by means of a flexible tube 90 to the tube 52. This gage is of the maximum reading type, that is, it is provided with a pointer that moves up the scale as the pressure is increased and remains at the position indicating the maximum reading reached before the pressure is relieved, until reset manually. A suitable manual reset lever 90 is provided to bring the pointer back to zero after the reading has been noted. The details of construction of the gage 88 form no part of this invention, and are well understood in the art.

The space within the gage and bellows assembly is entirely filled with a suitable fluid fill 92, preferably ethylene glycol or the like to which is added a small amount of corrosion inhibitor. In filling the apparatus, considerable care is taken to eliminate any air bubbles that may become trapped therein.

In operation, the motor 76 turns at a substantially constant speed, and the motion imparted to the base member 44 through the roller bearing 60 is a function of the shape of the cam 66. Preferably, the cam is rotated in the direction of the arrow in Fig. 1 at a constant angular speed. Each complete revolution of the cam is denoted as a "cycle" of the testing machine, and corresponds with the time interval required to test a single specimen.

The illustrated position may be termed the beginning of a cycle. In approximately the first quarter turn of the cam, little or no motion is imparted to the member 44. During the corresponding time interval, the operator inserts a paper specimen into the space between the clamping ring and diaphragm plate. In approximately the next half revolution following this initial interval, the displacement imparted to the member 44 preferably varies substantially linearly with time. Near the end of the cycle, the member 44 is quickly returned to its initial position as the roller bearing comes into contact with the surface 86 of the cam.

During the first quarter cycle of the cam 66 when the operator places the paper specimen in position between the ring 18 and plate 34, these elements remain separated. In the next half cycle more or less, the base member 44 is moved in a substantially linear fashion upwards into the sleeve 26, against the reaction of the spring 56, thereby moving the entire assembly 30, including the head member 32 and the diaphragm and diaphragm plate, upwards until the specimen is held firmly between the ring 18 and plate 34.

After the specimen has been thus clamped, a further increase in displacement of the member 44 tends to compress the bellows 42 and to increase the pressure in the fill 92. This increase in pressure has two effects, namely, to increase the pressure of the plate 34 against the ring 18, and to tend to expand the diaphragm 40 outwardly against the undersurface of the specimen. Since the area of the bore in the head member 32 is considerably smaller than the effective area of the bellows, the force with which the ring 18 and plate 34 are pressed together is considerably higher than the force brought to bear upon the diaphragm. Preferably, I use a ratio of effective areas of about 2½ to 1. It will be observed that this ratio is constant at all times, regardless of the pressure in the fill 92. By this means, I insure a tight grip upon the sample, which increases directly and proportionately as the bursting strength and tendency toward slippage increases.

Eventually, as the diaphragm 40 continues to bear with increasing pressure upon the specimen, the latter bursts, thus allowing the diaphragm to expand in volume. The pressure is thus reduced until the diaphragm resists further expansion by reason of its inherent elastic properties.

In approximately the last quarter revolution of the cam 66, the bellows assembly is quickly moved back to its original position, and the operator is thus provided with sufficient time to remove the burst sample and insert a new one, while noting the reading on the scale of the gauge 88 and resetting the gage by means of the lever 90.

It will thus be appreciated that the fill 92 is entirely sealed within the bellows and gage assembly, and cannot escape along sliding surfaces, as is true of the piston type testing machines. Also, the cam 66 revolves continuously in one direction only, and thus the need for a reversing mechanism has been eliminated. By using a completely filled liquid system which needs refilling only in the rare instances when a diaphragm bursts or is replaced, I have reduced the frequency with which the fill must be replenished for satisfactory operation, thus eliminating the likelihood that air bubbles will be inadvertently introduced into the system.

It will be appreciated that while I have described the invention with reference to a single embodiment, there are numerous variations of structure and arrangements of the parts that will occur to those skilled in this art, these variations being of the type that are commonly considered in the design of testing and similar apparatus. For example, other mechanisms can be substituted for the motor-driven cam arrangement illustrated. Also, many different types of motion can be imparted to the base member 44, depending largely upon the preferred manner in which the pressure is to be brought to bear upon the specimen. Other variations will occur to those skilled in the art upon a reading of the foregoing specification.

Having thus described the invention, I claim:

1. A strength testing machine for sheet material having, in combination, a frame, a clamping ring fixed to the frame, and a movable assembly supported in the frame including a diaphragm plate movable against the ring to clamp a specimen thereagainst, an elastomeric diaphragm retained by the plate, a fluid-filled bellows having one end sealed by the diaphragm and secured to the plate, and mechanism having provision to bear upon the other end of the bellows to urge the plate against the ring and to expand the diaphragm with increasing pressure outwardly toward the ring.

2. A strength testing machine for sheet material having, in combination, a frame, a clamping ring fixed to the frame, and a movable assembly supported in the frame including a diaphragm plate movable against the ring to clamp a specimen thereagainst, an elastomeric diaphragm retained by the plate, a fluid-filled bellows having one end sealed by the diaphragm and secured to the plate, and cam mechanism having provision to bear upon the other end of the bellows to urge the plate against the ring and to expand the diaphragm with increasing pressure outwardly toward the ring.

3. A strength testing machine for sheet material having, in combination, a frame, a clamping ring fixed to the frame, and a movable assembly supported in the frame including a diaphragm plate movable against the ring to clamp a specimen thereagainst, an elastomeric diaphragm retained by the plate, a fluid-filled bellows having one end sealed by the diaphragm and secured to the plate, and means to increase the pressure within the bellows to urge the plate against the ring and to expand the diaphragm with increasing pressure outwardly toward the ring.

4. A strength testing machine for sheet material having, in combination, a frame, a clamping ring and a hollow sleeve coaxially fixed to the frame, and a movable assembly slidably supported within the sleeve including a diaphragm plate movable against the ring to clamp a specimen thereagainst, an elastomeric diaphragm retained by the plate, a fluid-filled bellows having one end sealed by the diaphragm and secured to the plate, and mechanism having provision to bear upon the other end of the bellows to urge the plate against the ring and to expand the diaphragm with increasing pressure outwardly toward the ring.

5. A strength testing machine for sheet material having, in combination, a frame, a clamping ring and a hollow sleeve coaxially fixed to the frame, and a movable assembly including a hollow head member slidably supported within the sleeve, a diaphragm plate secured to the head member and movable against the ring to clamp a specimen thereagainst, an elastomeric diaphragm retained by the plate to seal an end of the head member, a fluid-filled bellows situated within the sleeve and having one end sealed to the head member, and mechanism having provision to bear upon the other end of the bellows to urge the plate against the ring and to expand the diaphragm with increasing pressure outwardly toward the ring.

6. A strength testing machine for sheet material having, in combination, a frame, a clamping ring and a pressure gage fixed to the frame, and a movable assembly supported in the frame including a diaphragm plate movable against the ring to clamp a specimen thereagainst, an elastomeric diaphragm retained by the plate, a fluid-filled bellows connected with the pressure gage and having one end sealed by the diaphragm and secured to the plate, and mechanism having provision to bear upon the other end of the bellows to urge the plate against the ring and to bulge the diaphragm with increasing pressure outwardly toward the ring.

7. A strength testing machine for sheet material having, in combination, a frame, a clamping ring and a hollow sleeve coaxially fixed to the frame, and a movable assembly including a hollow head member slidably supported within the sleeve, a diaphragm plate secured to the head member and movable against the ring to clamp a specimen thereagainst, an elastomeric diaphragm retained by the plate to seal an end of the head member, a fluid-filled bellows situated within the sleeve and having one end sealed to the head member, a base member slidably supported within the sleeve and sealed to the other end of the bellows, and a cam bearing upon the base member and continuously revolved in a cycle to urge the plate against the ring, to expand the diaphragm with increasing pressure outwardly toward the ring, and to permit return of the plate to its original position.

References Cited in the file of this patent

UNITED STATES PATENTS

| | | |
|---|---|---|
| 1,174,251 | Hankins et al. | Mar. 7, 1916 |
| 1,530,678 | La Batt et al. | Mar. 24, 1925 |
| 1,533,281 | Tautz | Apr. 14, 1925 |
| 2,518,959 | Tinker | Aug. 15, 1950 |
| 2,637,203 | Gehman | May 5, 1953 |